US010442311B2

(12) United States Patent
Lewis et al.

(10) Patent No.: US 10,442,311 B2
(45) Date of Patent: Oct. 15, 2019

(54) HYBRID AMPERAGE REGULATION POWER SYSTEM (71) Applicant: David Bryan Lewis, Amelia, VA (US)

(72) Inventors: David Bryan Lewis, Amelia, VA (US); David Patrick Fries, Leesburg, VA (US); Andrew Paul Uhlig, Mount Airy, MD (US); Jeremy Novoa, Vienna, VA (US)

(73) Assignee: David Bryan Lewis, Amelia, VA (US)

( * ) Notice: Subject to any disclaimer, the term of this patent is extended or adjusted under 35 U.S.C. 154(b) by 246 days.

(21) Appl. No.: 15/233,492

(22) Filed: Aug. 10, 2016

(65) Prior Publication Data

US 2018/0043784 A1    Feb. 15, 2018

(51) Int. Cl.
H02J 7/00       (2006.01)
B60L 53/20      (2019.01)
B60L 50/40      (2019.01)
B60L 50/15      (2019.01)
B60L 58/12      (2019.01)
B60L 58/21      (2019.01)
H02J 7/34       (2006.01)

(52) U.S. Cl.
CPC ............ B60L 53/20 (2019.02); B60L 50/15 (2019.02); B60L 50/40 (2019.02); B60L 58/12 (2019.02); B60L 58/21 (2019.02); H02J 7/0027 (2013.01); H02J 7/0045 (2013.01); H02J 7/0077 (2013.01); B60L 2260/22 (2013.01); H02J 7/345 (2013.01); Y02T 10/7005 (2013.01); Y02T 10/7022 (2013.01); Y02T 10/7044 (2013.01); Y02T 10/7061 (2013.01); Y02T 10/7077 (2013.01)

(58) Field of Classification Search
CPC . B60L 11/1811; B60L 11/005; B60L 11/1861; H02J 7/0027; H02J 7/0045; H02J 7/0077
USPC ................................ 320/103, 109, 166, 167
See application file for complete search history.

(56) References Cited

U.S. PATENT DOCUMENTS

| 2003/0231006 | A1* | 12/2003 | Tojima | H01M 10/48 320/132 |
| 2007/0164693 | A1 | 7/2007 | King et al. | |
| 2007/0278994 | A1 | 12/2007 | Mayega et al. | |
| 2014/0197787 | A1 | 7/2014 | Mashinsky et al. | |
| 2015/0288206 | A1 | 10/2015 | Aronov et al. | |
| 2015/0300307 | A1* | 10/2015 | Setterberg | F02N 11/087 701/113 |

FOREIGN PATENT DOCUMENTS

WO    2015092422 A1    6/2015

OTHER PUBLICATIONS

International Search Report issued in related co-pending PCT/US2017/035675 dated Oct. 3, 2017.

* cited by examiner

Primary Examiner — Zixuan Zhou
(74) Attorney, Agent, or Firm — McGuireWoods LLP (57) ABSTRACT A power system includes an input node connected to a power source of a vehicle, an output node connected to a load of the vehicle, a super capacitor connected to the output node, a battery connected to a first node, and a contactor coupled between the battery and the super capacitor. The contactor is configured to be turned on to charge the super capacitor with power from the battery in a fast charge mode.

10 Claims, 6 Drawing Sheets

| MODE | SW1 | SW2 | SW3 | SW4 | SW5 | CONTACTOR |
|---|---|---|---|---|---|---|
| SUPER CAP SLOW CHARGE WITH VEHICLE POWER | IN1 | OUT1 | ON | OFF | OFF | OFF |
| SUPER CAP SLOW CHARGE WITH BATTERY POWER | IN2 | OUT1 | ON | OFF | OFF | OFF |
| SUPER CAPACTIOR FAST CHARGE | NA | NA | OFF | OFF | ON | ON |
| BATTERY CHARGE | IN1 | OUT2 | OFF | ON | OFF | OFF |

FIG. 3

HYBRID AMPERAGE REGULATION POWER SYSTEM

FIELD OF THE DISCLOSURE

The present disclosure relates generally to an electrical power supply scheme and more specifically it relates to a hybrid electrical power supply scheme using electric charge devices.

BACKGROUND OF THE DISCLOSURE

A vehicle is a mobile machine that transports people or cargo. Typical vehicles include land vehicles, watercraft, aircraft, spacecraft, and the like. The land vehicles include wheeled vehicles, tracked vehicles, railed vehicles, skied vehicles and the like. A large portion of vehicles are equipped with one or more electrical loads. For example, many commercial and industrial trucks are equipped with a liftgate (or tailgate), a refrigeration unit, a trash compactor, a truck bed lifter, a snowplow, a lighting system, and/or the like. Electric power for operating such electrical loads is typically provided by the vehicle's electrical system. By way of an example, when a vehicle's ignition power is on, an alternator supplies electrical power to the vehicle while keeping the vehicle battery charged sufficiently. When the engine is not running, the electrical load draws electrical power solely from the vehicle battery. While being on a mission, the vehicle batteries can be discharged to the point where they cannot operate the liftgate anymore, and consequently will be incapable of powering the electrical load and starting the engine. Accordingly, there is a need for a power system that provides sufficient power to electrical loads in a more stable and predictable manner.

SUMMARY OF THE DISCLOSURE

One aspect of the present disclosure provides a power system, which includes an input node connected to a power source of the a vehicle, an output node connected to a load of the vehicle, a super capacitor connected to the output node, a battery connected to a first node, and a contactor coupled between the battery and the super capacitor configured to be turned on to charge the super capacitor with power from the battery in a fast charge mode.

The load may include a liftgate. The power system may further include a converter that boosts power from one of the power source and the battery to charge the super capacitor in a slow charge mode. The converter may boost the power from the power source when vehicle ignition power is on in the slow charge mode. The converter may boost the power from the battery when the vehicle ignition power is off in the slow charge mode.

The converter may boost the power from the power source to charge the battery in a battery charge mode. The power system may further include a controller that operates that power system in one of the slow charge mode, the fast charge mode and the battery charge mode. The controller may operate the power system in the slow charge mode when the super capacitor needs to be charged and the load is not being operated. The controller may operate the power system in the fast charge mode when the super capacitor needs to be charged and the load is being operated. The controller may operate the power system in the battery charge mode when vehicle ignition power is on, the super capacitor does not need to be charged and the battery needs to be charged.

The power system may further include a plurality of switches controlled by the controller. The plurality switches may comprise a first switch including a first input connected to the input node, a second input connected to the first node, and an output connected to an input of the converter. The plurality of switches may also include a second switch including an input connected to an output of the converter, a first output connected to the output node, and a second output connected to the first node. The plurality of switches may further include a third switch coupled between the first output of the second switch and the output node, a fourth switch coupled between the second output of the second switch and the first node, and a fifth switch coupled between the first node and a control terminal of the contactor.

In the slow charge mode, the first input of the first switch may be connected to the output of the first switch when the vehicle ignition power is on, and the second input of the first switch may be connected to the output of the first switch when the vehicle ignition power is off. In the slow charge mode, the input of the second switch may be connected to the first output of the second switch, the third switch may be turned on, and the fourth and fifth switches and the contactor may be turned off when the vehicle ignition power is on.

In the fast charge mode, the third and fourth switches may be turned off and the fifth and the contactor are turned on.

In the battery charge mode, the first input of the first switch may be connected to the output of the first switch, the input of the second switch may be connected to the second output of the second switch, the third and fifth switches and the contactor may be turned off, and the fourth switch may be turned on.

According to another aspect of the disclosure, a process of operating a power system, which includes a power source of a vehicle, a battery, a super capacitor and a load, includes determining whether the super capacitor needs to be charged, determining whether the load is being operated, and operating the power system in a fast charge mode when the super capacitor needs to be charged and the load is being operated. The operating the power system in the fast charge mode includes charging the super capacitor with power from the battery.

The fast charge mode may be terminated when a voltage of the super capacitor is not less than a voltage of the battery.

The process may further include operating the power system in a slow charge mode when the super capacitor needs to be charged and the load is not being operated. The operating the power system in the slow charge mode may include boosting power from the power source or the battery, and charging the super capacitor with the boosted power.

The boosting the power may include determining whether vehicle ignition power is on or off, boosting the power from the power source when the vehicle ignition power is on, and boosting the power from the battery when the vehicle ignition power is off.

The process may further include determining whether vehicle ignition power is on, determining whether the battery needs to be charged, and operating the power system in a battery charge mode when the vehicle ignition power is on, the super capacitor does not need to be charged and the battery needs to be charged. The operating the power system in the battery charge mode may include boosting the power form the power source, and charging the battery with the boosted power.

According to yet another aspect of the disclosure, a computer readable non-transitory storage medium embodies a computer readable program having computer readable instructions which, when read and executed by a computer, cause the computer to carry out a process of operating a power system, the power system comprising a power source of a vehicle, a battery, a super capacitor and a load. The instructions include instructions for determining whether the super capacitor needs to be charged, instructions for determining whether the load is being operated, and instructions for operating the power system in a fast charge mode when the super capacitor needs to be charged and the load is being operated. The instructions for operating the power system in the fast charge mode include instructions for charging the super capacitor with power from the battery.

The instructions may further include instructions for terminating the fast charge mode when a voltage of the super capacitor is not less than a voltage of the battery.

The instructions may further include instructions for operating the power system in a slow charge mode when the super capacitor needs to be charged and the load is not being operated. The instructions for operating the power system in the slow charge mode may include instructions for boosting power from the power source or the battery, and instructions for charging the super capacitor with the boosted power.

The instructions for boosting the power may include instructions for determining whether vehicle ignition power is on or off, instructions for boosting the power from the power source when the vehicle ignition power is on, and instructions for boosting the power from the battery when the vehicle ignition power is off.

The instructions may further include instructions for determining whether vehicle ignition power is on, instructions for determining whether the battery needs to be charged, and instructions for operating the power system in a battery charge mode when the vehicle ignition power is on, the super capacitor does not need to be charged and the battery needs to be charged. The instructions for operating in the battery charge mode may include instructions for boosting the power form the power source, and instructions for charging the battery with the boosted power.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms "including." "comprising" and variations thereof, as used in this disclosure, mean "including, but not limited to." unless expressly specified otherwise.

The terms "a," "an," and "the," as used in this disclosure, mean "one or more," unless expressly specified otherwise.

Devices that are in communication with each other need not be in continuous communication with each other, unless expressly specified otherwise. In addition, devices that are in direct contact with each other may contact each other directly or indirectly through one or more intermediary articles or devices.

Although process steps, method steps, or the like, may be described in a sequential order, such processes and methods may be configured in alternate orders. In other words, any sequence or order of steps that may be described does not necessarily indicate a requirement that the steps be performed in that order. The steps of the processes or methods described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device or article may be alternatively embodied by one or more other devices or articles which are not explicitly described as having such functionality or features.

The disclosure is directed to a hybrid amperage regulation power technique using an electric charge device, such as, for example, a super capacitor, an ultra capacitor and/or the like. When stationary electric power is not readily available, a conventional charge device (e.g., battery) alone may not meet the electrical power demand to operate electrical loads. Also, batteries require an extended amount of time to recharge, and degrade as a recharge and discharge cycle repeats for an extended period of time. Batteries even fail to recharge in extreme weather conditions. In contrast, alternative charge devices, such as, for example, a super capacitor, an ultra capacitor, and the like, can recharge much faster than recharging a battery even in extreme weather conditions and does not degrade over an extended period of usage. Super or ultra capacitors, however, may not be charged by batteries alone mainly due to the differences in the internal resistances. According to the hybrid amperage regulation power scheme provided in this disclosure, a super or ultra capacitor and a battery may be monitored and selectively charged such that sufficient electric power may be always available to power electrical loads.

Figure 1:
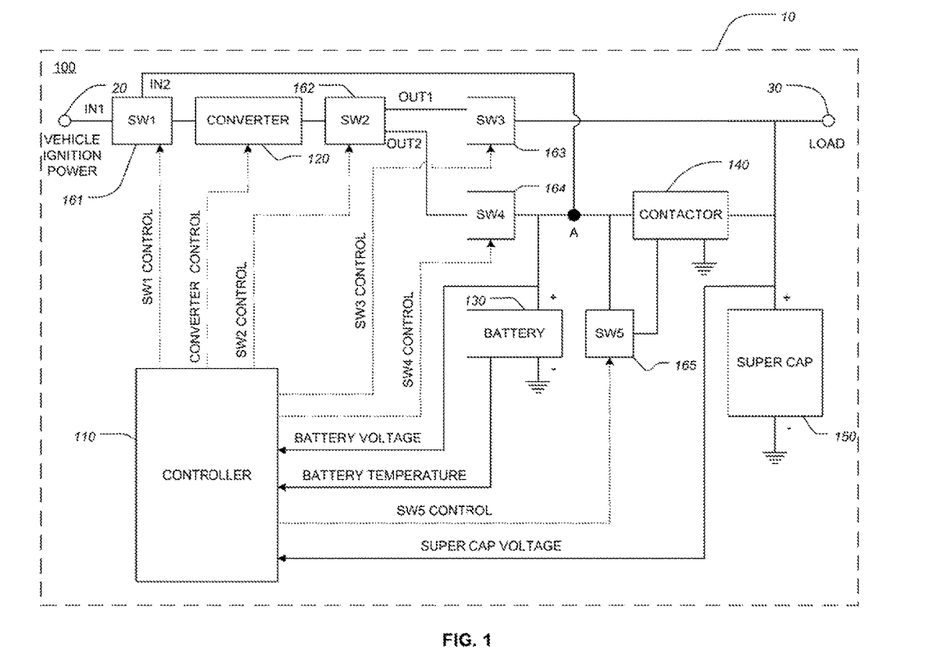
FIG. 1 illustrates an example of a power supply system, constructed according to the principles of the disclosure.

FIG. 1 illustrates a power system 100 constructed according to the principles of the disclosure. The system 100 may be part of a larger system, such as, for example, a vehicle 10. The system 100 may be provided to electrically power an electrical load of the vehicle 10. The system 100 may be an auxiliary power system provided in addition to a main power system of the vehicle 10. Alternatively, the system 100 may be a main power system of the vehicle 10. The vehicle 10 may be, for example, a land vehicle (e.g., bicycle, motorcycle, motor vehicle, railed vehicle, tracked vehicle, skied vehicle, or the like), a watercraft (e.g., ship, boat, yacht, vessel, submarine, or the like), an aircraft (e.g., balloon, fixed-wing aircraft, rotorcraft, or the like), a spacecraft (e.g., spaceplane, rocket, orbital satellite, space probe, space station, or the like), a weapon (e.g., artillery, missile, rocket, or the like), heavy or light equipment (e.g., construction equipment, agricultural equipment, drilling tool, fire apparatus, laboratory equipment, medical equipment, military equipment, scientific instruments, or the like), or any other mobile or stationary machinery, which may not have an access to a stationary power supply (e.g., power outlet, power generator, etc.). The vehicle 10 may be, for example, a commercial/industrial truck or the like. The load may be, for example, a liftgate (or tailgate) attached to a rear portion of the truck, a refrigeration unit, a trash compactor, a truck bed lifter, a snowplow system, a lighting system, and/or the like.

The power system 100 may be coupled between an input node 20 connected to a power source of the vehicle 10 and an output node 30 connected to the electrical load of the vehicle 10. For example, the power source may be a vehicle ignition power (e.g., vehicle battery) or the like. The power system 100 may include a controller 110, a converter 120, a battery 130, a contactor 140, a super capacitor 150 and/or the like. The power system 100 may also include a plurality of switches, such as, for example, first switch (SW1) 161, second switch (SW2) 162, third switch (SW3) 163, fourth switch (SW4) 164, fifth switch (SW5) 165, and/or the like. The controller 110 may collect status information, such as, for example, a voltage of the battery 130 (BATTERY VOLTAGE), a temperature of the battery 130 (BATTERY TEMPERATURE), a voltage of the super capacitor 150 (SUPER CAP VOLTAGE), and/or the like.

Based on the collected information, the controller 110 may operate the system 100 in one of a plurality of operational modes, which is further described below. For example, the controller 110 may generate and provide control signals SW1 CONTROL, SW2 CONTROL, SW3 CONTROL, SW4 CONTROL, SW5 CONTROL to the switches 161, 162, 163, 164, 165, respectively. The controller 110 may also provide a controls signal CONVERTER CONTROL to the converter 120. The controller 110 may be a general-purpose microprocessor with one or more ROM, RAM, or I/O functions integrated onto the package, such as, for example, Texas Instruments™ TI MSP430™ or MSP432™, ARM™ Cortex-M™, or the like. The controller 100 (may read and execute instructions stored in a computer readable non-transitory medium to carry out a process of operating the power system 100, for example, a process 200 shown in FIGS. 2A, 2B, 2C, 2D. The controller 110 and the switches 161, 162, 163, 164, 165 may require a small amount of power to operate and may stay on and operate even when the vehicle 10 is turned off.

As seen in FIG. 1, the first switch 161 may have a first input IN1 connected to the input node 20, a second input IN2 connected to a node A, and an output connected to an input of the converter 120. An output (i.e., positive terminal) of the battery 130 and an input of the contactor 140 may be also connected to the node A. The first switch 161 may selectively connect one of the two inputs IN1. IN2 to the output based on the control signal SW1 CONTROL from the controller 110. The first switch 161 may be, for example, a single pole double throw (SPDT) switch, or the like.

The converter 120 may be an adjustable DC-to-DC converter, such as, for example, buck-boost converter, which may produce an adjustable range of output voltages, for example, from about 6 V to about 60 V. The converter 120 may be controlled by the control signal CONVERTER CONTROL from the controller 110. The converter 120 may be connected between the output of the first switch 161 and an input of the second switch 162. The second switch 162 may have two outputs OUT1, OUT2. The second switch 162 may selectively connect the input to one of the two outputs OUT1, OUT2 based on the control signal SW2 CONTROL from the controller 110. The first output OUT1 of the second switch 162 may be connected to an input of the third switch 163, and the second output OUT2 of the second switch 162 may be connected to an input of the fourth switch 164. The second switch 162 may be, for example, a SPDT switch or the like. The third switch 163 may be an on-off (connect-disconnect) switch, which may be turned on and off based on the control signal SW3 CONTROL from the controller 110. An output of the third switch 163 may be connected to the output node 30. An output of the fourth switch 164 may be connected to the node A. The fourth switch 164 may be an on-off (connect-disconnect) switch, which may be turned on and off based on the control signal SW4 CONTROL from the controller 110.

The battery 130 may be coupled between the node A and a ground. The controller 110 may receive voltage information BATTERY VOLTAGE from the battery 130. The voltage information may include a current voltage of the battery 130. The controller 110 may also receive temperature information BATTERY TEMPERATURE of the battery 130. The temperature information may include a current temperature of the battery 130. The temperature information Battery TEMPERATURE may be used to adjust or compensate the charge voltage or amperage. Temperature-based adjustment or compensation may provide more efficient battery charging and ensure the battery chemistry is not damaged. For example, when the temperature of the battery 130 is low, the battery charge amperage may be increased. When the temperature of the battery 130 is high, the battery 130 may be charged with less amperage. Temperature information (e.g., current temperature) of the super capacitor 150 may also be used to adjust or compensate the charge voltage for the super capacitor 150.

Referring back to FIG. 1, the second input IN2 of the first switch 161, the output of the fourth switch SW4 and the positive terminal of the battery 130 may be connected to the node A. The fifth switch 165 may be an on-off (connect-disconnect) switch. An input of the fifth switch 165 and an input of the contactor 140 may also be connected to the node A. An output of the fifth switch 165 may be connected to a control terminal of the contactor 140. The fifth switch 165 may be turned on and off based on the control signal SW5 CONTROL from the controller 110. An output of the contactor 140 may be connected to the output node 30. The super capacitor 150 may be coupled between the output node 30 and the ground. The controller 110 may receive voltage information (SUPER CAP VOLTAGE) from the super capacitor 150. The voltage information may include a current voltage of the super capacitor 150.

The controller 110 may collect status information, such as, for example, BATTERY VOLTAGE, BATTERY TEMPERATURE, SUPER CAP VOLTAGE, and/or the like, from various sources, such as, for example, the vehicle 10, the battery 130, the super capacitor 150 and/or the like. Based on the collected information, the controller 110 may operate the system 100 in one or plurality of operational modes, which may include, for example, a slow charge mode, a fast charge mode, a battery charge mode, and/or the like.

FIGS. 2A, 2B, 2C and 2D illustrate a flow chart of an example of a process 200 of dynamically operating the system 100 including the super capacitor 150 according to the principles of the disclosure.

All flow charts herein (including FIGS. 2A-2D) may equally represent a high-level block diagram of computer based components of the invention implementing the steps thereof. The steps and/or components may be implemented as computer logic or computer instructions in combination with the appropriate computing hardware to execute the computer logic or instructions. This computer program code or computer instructions may be stored on storage media such as a diskette, hard disk, CD-ROM, DVD-ROM or tape, as well as a memory storage device or collection of memory storage devices such as read-only memory (ROM) or random access memory (RAM), for example. Additionally, the computer program code can be transferred to a workstation over the Internet or some other type of network. The computer code or instructions may be a computer program product that is stored on a non-transitory computer readable medium.

Figure 2A:
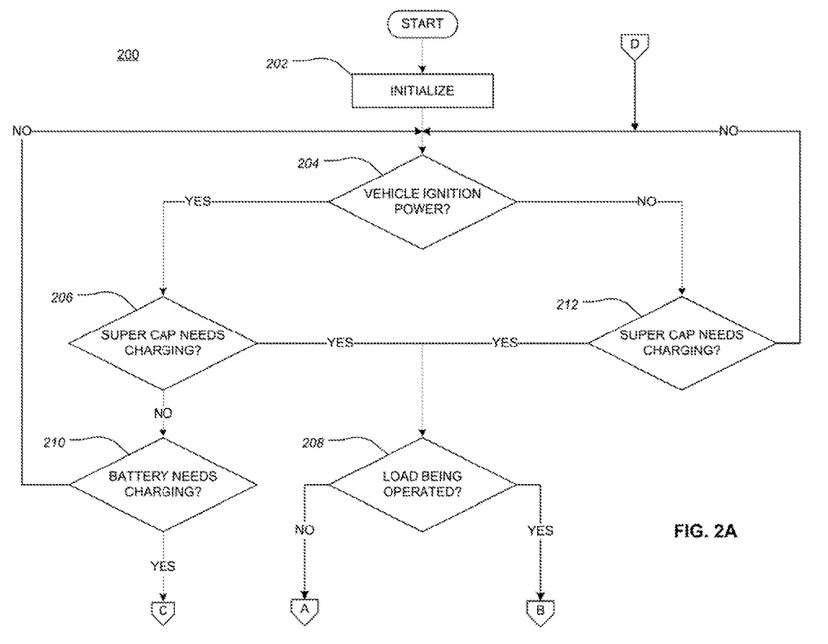
FIGS. 2A, 2B, 2C and 2D illustrate a process of operating the power supply system shown in FIG. 1 according to the principles of the disclosure.
Figure 3:
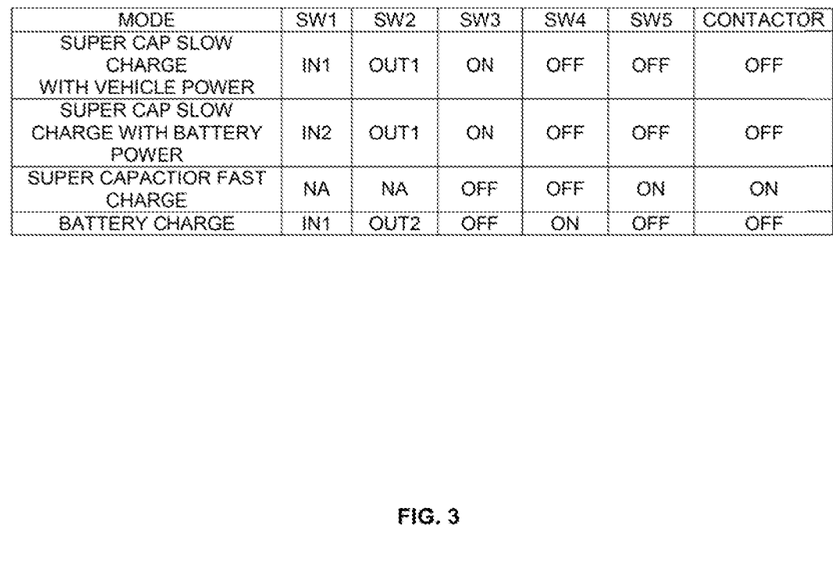
FIG. 3 illustrates an input/output selection and ON/OFF status table of a plurality of switches and an actuator of the power supply system shown in FIG. 1.

FIG. 2A illustrates a flow chart of a portion of the process 200 directed to determining an operation mode of the system 100. FIG. 3 illustrates an example of an input/output selection and ON/OFF status table of the switches 161, 162, 163, 164, 165 and the contactor 140 in the various operational modes according to the principles of the disclosure.

In FIG. 2A, upon starting the process 200, the system 100 may be powered by, for example, the vehicle ignition power at the input node 20, and initialized (at 202). The controller 110 may then determine whether the vehicle ignition power is turned on or off (at 204). If the vehicle ignition power is turned on (YES at 204), the controller 110 may determine whether the super capacitor 150 needs to be charged (at 206). For example, the controller 110 may receive the voltage information (SUPERCAP VOLTAGE) from the super capacitor 150, and may determine whether the voltage of the super capacitor 150 is lower than a predetermined value. When the voltage of the super capacitor 150 is lower than the predetermined value, the controller 110 may determine that the super capacitor needs to be charged (YES at 206). Once it is determined that the super capacitor 150 needs to be charged (YES at 206), the controller 110 may determine whether the load at the output node 30 is being operated or not (at 208). When the load is not being operated (NO at 208) and does not need to draw power, the system 100 may be operate in the slow charge mode (connector A) to charge the super capacitor 150 in a non-urgent manner. The slow charge mode is discussed below with reference to FIG. 2B. When the super capacitor 206 needs to be charged (YES at 206) and the load is being operated (YES at 208), the super capacitor 150 may need to be charged in an urgent manner. In this case, the system 100 may be operated in the fast charge mode (connector B), which is discussed below with reference to FIG. 2C.

In step 206, when the super capacitor 150 does not need to be charged (NO at 206), the controller 110 may determine whether the battery 130 needs to be charged (at 210). For example, the controller 110 may receive the voltage information (BATTERY VOLTAGE) from the battery 130. The controller 110 may then determine whether the voltage of the battery 130 is higher than a predetermined value, for example, about 13.5 V. When the voltage of the battery 130 is higher than the predetermined value, the controller 1I 10 may determine that the battery 130 does not need to be charged (NO at 210) and the process 200 may loop back, for example, to step 204 to determine whether the vehicle ignition power is on or not. When the voltage of the battery 130 is lower than the predetermined value (YES at 210), the controller 110 may operate the system 100 in the battery charge mode (connector C) to charge the battery 130, which is described below with reference to FIG. 21).

In step 204, when the vehicle ignition power is off (NO at 204), the controller 110 may determine whether the super capacitor 150 needs to be charged (at 212). When the super capacitor 150 needs to be charged (YES at 212), the process 200 may move forward to step 208, which is described above. When the super capacitor 150 does not need to be charged (NO at 212), the process 200 may loop back, for example, to step 202 to determine whether the vehicle ignition power is on or off. As such, the controller 110 may dynamically control the system 100 to efficiently charge the super capacitor 150 and the battery 130 to provide sufficient power to the load in a stable and predictable manner.

Figure 2B:
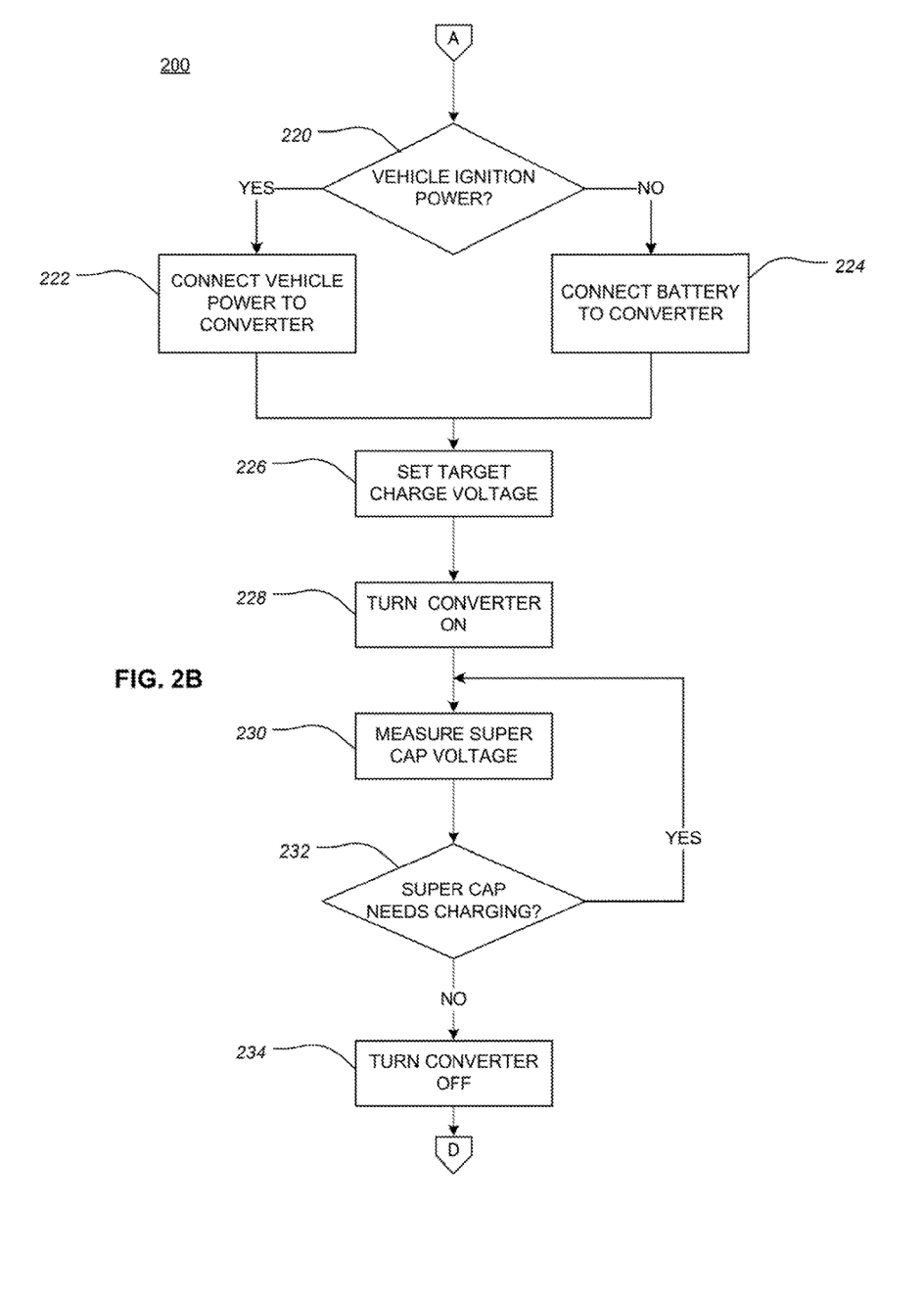

As seen in FIG. 2A, the system 100 may operate in the slow charge mode (connector A) when the super capacitor 150 needs to be charged (YES at 206, 212) and the load at the output node 30 is not being operated (NO at 208). FIG. 2B illustrates a flow chart of a portion of the process 200 directed to operating the system 100 in the slow charge mode. Upon entering the slow charge mode (connector A), the controller 110 may determine whether the vehicle ignition power is on or off (at 220). If the vehicle ignition power is on (YES at 220), the super capacitor 150 may be charged with the power from the vehicle ignition power at the input node 20. For example, the controller 110 may selectively control the switches 161, 162, 163, 164, 165 and the contactor 140 to relay power from the vehicle ignition power to the super capacitor 150. For example, as seen in FIG. 3, the first input IN1 of the first switch 161 connected to the vehicle power may be selected for connection with the output thereof, and the first output OUT1 of the second switch 161 may be selected for connection with the input thereof. Also, the third switch 163 may be turned on, and the fourth and fifth switches 164, 165 and the contactor 140 may be turned off. With this arrangement, the converter 120 may be connected to the vehicle ignition power at the input node 20 via the first switch 161, and the super capacitor 150 may be connected to the converter 120 via the second and third switches 162, 163.

Referring back to FIG. 2B, when the vehicle ignition power is off (NO at 220), the super capacitor 150 may be charged with the power from the battery 130. For example, as seen in FIG. 3, the second input IN2 (connected to node A) of the first switch 161 may be selected for connection with the output thereof, and the first output OUT1 of the second switch 162 may be selected for connection with the input thereof. Also, the third switch 163 may be turned on, and the fourth and fifth switches 164, 165 and the contactor 140 may be turned off. With this arrangement, the converter 120 may be connected to the battery 130 (224) via the node A and the first switch 161, and the super capacitor 150 may be connected to the converter 120 via the second and third switches 162, 163.

Once the input node 20 is connected to the converter 120 (at 222) or to battery 130 (at 224), the controller 110 may set a target charge voltage for the converter 120 (at 226). For example, the target charge voltage may be about 15.5 V. Then, the converter 120 may be turned on (at 228) to boost the power from the vehicle ignition power or the battery 130 to the target charge voltage. The boosted power may be provided to the super capacitor 150 via the second and third switches 162, 163. The controller 110 may then measure the voltage of the super capacitor 150 (at 230) based on, for example, the voltage information (SUPER CAP VOLTAGE) of the super capacitor 150, and may determine whether the super capacitor 150 needs to be charged more (at 232). When the measured voltage level of the super capacitor 150 is lower than a predetermined level (e.g., about 15.0 V (to a programmable peaked voltage based on application)), the controller 110 may determine that the super capacitor 150 needs to be charged more (YES at 232) and may control the converter 120 to continue to provide the power to charge the super capacitor 150. A voltage of the super capacitor 150 may be measured (23) repeatedly with a predetermined interval (e.g., about 100 milliseconds) until the super capacitor 150 is determined to be sufficiently charged (NO at 232). When the super capacitor 150 is determined to be sufficiently charged to the predetermined level (NO at 232), the converter 120 may be turned off (at 234). The slow charge mode may then be terminated (connector D) and the process 200 may loop back, for example, to determine the next operational mode, which is shown in FIG. 2A.

Figure 2C:
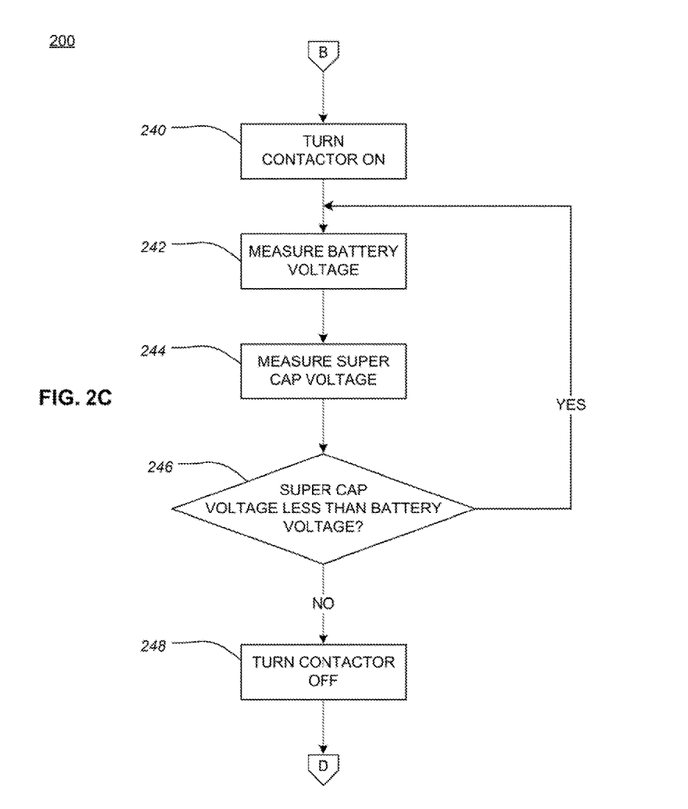

As seen in FIG. 2A, the system 100 may operate in the fast charge mode (connector B) when the super capacitor 150 needs to be charged (YES at 206, 212) and the load is being used (YES at 208). FIG. 2C illustrates a flow chart of a portion of the process 200 directed to operating the system 100 in the fast charge mode. As seen in FIG. 3, in the fast charge mode, the third and fourth switches 163, 164 may be turned off, and the fifth switch 165 and the contactor 140 may be turned on such that the super capacitor 150 is connected to the battery 130 via the contactor 140. Hence, in the fast charge mode, the super capacitor 150 may be charged in an urgent manner by directly drawing the power from the battery 130.

Referring to 2C, upon entering the fast charge mode (connector B), the contactor 140 may be turned on (at 240) to establish a direct current path between the battery 130 and the super capacitor 150. For example, the controller 110 may turn on the fifth switch 165, which may in turn activate the contactor 140 by, for example, relaying the voltage at the node A to the control terminal of the contactor 140. The super capacitor 150 may then be connected to and charged by drawing the power from the battery 130 via the contactor 140. While the capacitor 150 is being charged, the controller 110 may measure the voltage (BATTERY VOLTAGE) of the battery 130 (at 242) and the voltage (SUPER CAP VOLTAGE) of the super capacitor 150 (at 244). While the voltage of the super capacitor 150 is lower than the voltage of the battery 130 (YES at 246), the contactor 240 may stay turned on to continue to charge the super capacitor 150. In the meantime, the voltages of the battery 130 and the super capacitor 150 may be measured (242, 244) repeatedly with a predetermined interval (e.g., about 100 millisecond). When the voltage of the super capacitor 150 is not less than the voltage level of the battery 130 (NO at 246), the battery 130 may not able to charge the super capacitor 150 anymore. Hence, the controller 110 may turn off the contactor 140 (at 248) and the fast charge mode may terminate (connector D). The process 200 may then loop back, for example, to determine the next operational mode, which is shown in FIG. 2A.

Referring back to FIG. 2A, when the vehicle ignition power is on (YES at 204), the super capacitor 150 does not need to be charged (NO at 206) and the battery 130 needs to be charged (YES at 210), the system 100 may operate in the battery charge mode (connector C) to charge the battery 130. Referring to FIG. 3, in the battery charge mode, the first input IN1 of the first switch 161 may be selected for connection with the input node 20 to the converter 120. Also, the second output OUT2 of the second switch 162 may be selected for connection with the input. The fourth switch 164 may be turned on to connect the converter 120 to the battery 130. The third and fifth switches 163, 165 and the contactor 150 may be turned off. With this arrangement, the converter 120 may be connected to the vehicle ignition power, and the battery 130 may be connected to the converter 120.

Figure 2D:
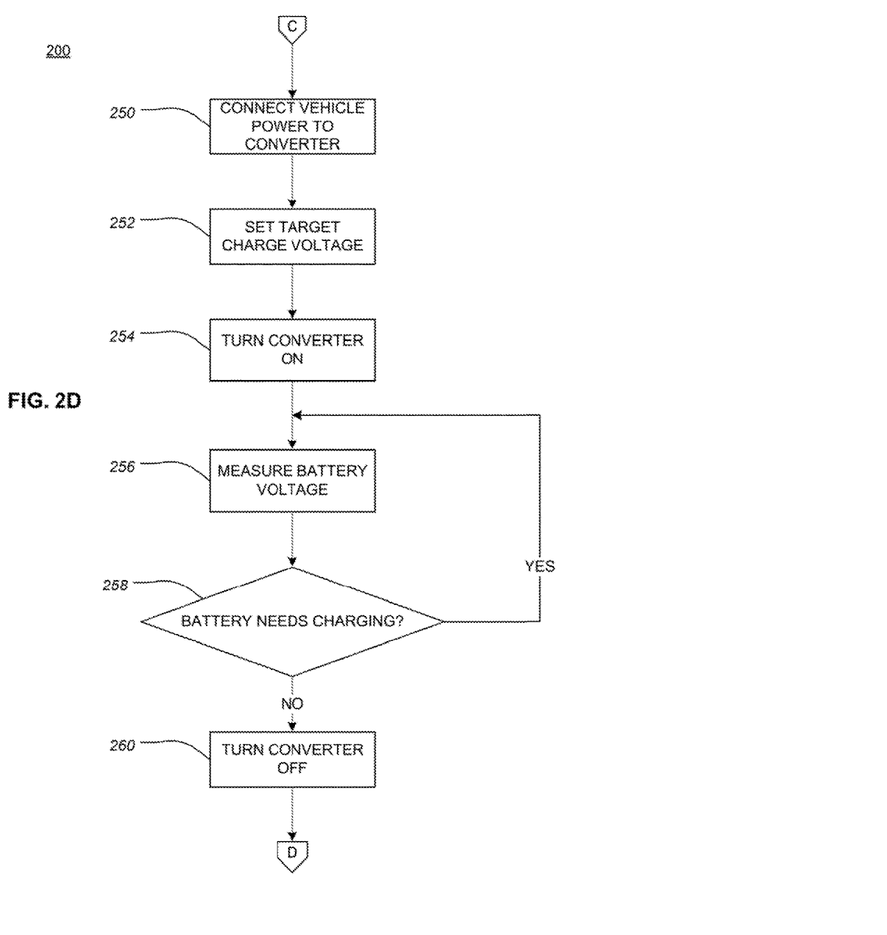

FIG. 2D illustrates a flow chart of a portion of the process 200 directed to operating the system 100 in the battery charge mode. Upon entering the battery charge mode (connector C), the input node 20 may be connected to the converter 120. For example, the controller 110 may control the first switch 161 to select the first input IN1 for connection with the output thereof, thereby connecting the vehicle ignition power to the converter 120. Then, the controller 110 may set a target charge voltage for the converter 120 (at 252). The target charge voltage may be determined based on the battery voltage information BATTERY VOLTAGE (e.g., initial battery voltage), the battery temperature information BATTERY TEMPERATURE (e.g., current battery temperature), and/or the like. For example, the target charge voltage may be about 13.7 V. Then, the converter 120 may be turned on (at 254) to boost the power to the target charge level. The boosted power may be provided to the battery 130 via the second and fourth switches 162, 164. The controller 110 may then measure a voltage of the battery (at 256) and may determine whether the battery 130 needs to be charged more (at 258). When the measured voltage of the battery 130 is lower than a predetermined value (e.g., about 13.5 V) (YES at 232), the converter 120 may continue to provide the power to charge the battery 130. In the meantime, the voltage of the battery 130 may be measured (256) repeatedly with a predetermined interval (e.g., about 100 milliseconds) until the voltage of the battery 130 reaches the predetermined value. When the battery 130 is determined to be sufficiently charged to the predetermined level (NO at 232), the converter 120 may be turned off (at 260) and the slow charge mode may be terminated (connector D) and the process 200 may loop back, for example, to determine the next operational mode, as shown in FIG. 2A.

The power system and process of the disclosure may provide unlimited power supply to a vehicle load in a stable and predictable manner. Hence, the disclosed system and process may prevent equipment failures and breakdowns, thereby reducing or eliminating unexpected and costly road services and repairs. Accordingly, the disclosed system and process may improve overall safety, productivity, profitability and customer satisfaction.

While the disclosure has been described in terms of exemplary embodiments, those skilled in the art will recognize that the disclosure can be practiced with modifications in the spirit and scope of the appended claim, drawings and attachment. The examples provided herein are merely illustrative and are not meant to be an exhaustive list of all possible designs, embodiments, applications or modifications of the disclosure.

What is claimed is:

1. A process of regulating amperage to charge a power system, the power system comprising a power source of a vehicle, a battery, a super capacitor and a load, the method comprising:
   determining whether the super capacitor needs to be charged;
   determining whether the load is being operated;
   determining whether to charge the battery;
   in response to a determination to charge the super capacitor and in response to determination to charge the battery based on a charge mode of vehicle ignition power and load operation, determine one of a plurality of current paths to charge the super capacitor and the battery; and
   operating the power system in a fast charge mode when the super capacitor needs to be charged and the load is being operated,
   wherein operating the power system in the fast charge mode comprises:
      switching on a contactor coupled to the battery and the super capacitor to establish a first current path of the plurality of current paths between the battery and the super capacitor; and
      after the first current path is established between the battery and the super capacitor, charging the super capacitor with power from the battery via the contactor.

2. The process of claim 1, wherein the fast charge mode is terminated when a voltage of the super capacitor is not less than a voltage of the battery.

3. The process of claim 1, further comprising operating the power system in a slow charge mode when the super capacitor needs to be charged while the load is not being operated,
   wherein the operating the power system in the slow charge mode comprises:
      switching off the contactor;
      boosting power from the power source or the battery; and
      charging the super capacitor with the boosted power via a second current path of the plurality of current paths.

4. The process of claim 3, wherein the boosting the power comprises:
   determining whether the vehicle ignition power is on or off;
   boosting the power from the power source when the vehicle ignition power is on; and
   boosting the power from the battery when the vehicle ignition power is off.

5. The process of claim 1, further comprising:
   determining whether the vehicle ignition power is on;
   determining whether the battery needs to be charged; and
   operating the power system in a battery charge mode when the vehicle ignition power is on, the super capacitor does not need to be charged and the battery needs to be charged,
   wherein the operating the power system in the battery charge mode comprises:
      boosting the power from the power source; and
      charging the battery with the boosted power.

6. A computer readable non-transitory storage medium embodying a computer readable program having computer readable instructions which, when read and executed by a computer, cause the computer to carry out a process of operating a power system, the power system comprising a power source of a vehicle, a battery, a super capacitor and a load, the instructions comprising:
   instructions for determining whether the super capacitor needs to be charged;
   instructions for determining whether the load is being operated;
   instructions to determine whether to charge the battery;
   in response to a determination to charge the super capacitor and in response to determination to charge the battery based on a charge mode of vehicle ignition power and load operation, instructions for determining one of a plurality of current paths to charge the super capacitor based on a charge mode of the vehicle; and
   instructions for operating the power system in a fast charge mode when the super capacitor needs to be charged and the load is being operated,
   wherein the instructions for operating the power system in the fast charge mode comprise:
      instructions for switching on a contactor coupled to the battery and the super capacitor to establish a first current path of the plurality of current paths between the battery and the super capacitor; and
      after the first current path is established between the battery and the super capacitor, instructions for charging the super capacitor with power from the battery.

7. The computer readable non-transitory storage medium of claim 6, the instructions further comprise instructions for terminating the fast charge mode when a voltage of the super capacitor is not less than a voltage of the battery.

8. The computer readable non-transitory storage medium of claim 6, the instructions further comprise instructions for operating the power system in a slow charge mode when the super capacitor needs to be charged and the load is not being operated,
   wherein the instructions for operating the power system in the slow charge mode comprise:
      instructions for boosting power from the power source or the battery; and
      instructions for charging the super capacitor with the boosted power.

9. The computer readable non-transitory storage medium of claim 8, wherein the instructions for boosting the power comprise:
   instructions for determining whether the vehicle ignition power is on or off;
   instructions for boosting the power from the power source when the vehicle ignition power is on; and
   instructions for boosting the power from the battery when the vehicle ignition power is off.

10. The computer readable non-transitory storage medium of claim 6, the instructions further comprising:
    instructions for determining whether the vehicle ignition power is on;
    instructions for determining whether the battery needs to be charged; and
    instructions for operating the power system in a battery charge mode when the vehicle ignition power is on, the super capacitor does not need to be charged and the battery needs to be charged,
    wherein the instructions for operating in the battery charge mode comprise:

instructions for boosting the power form the power source; and instructions for charging the battery with the boosted power.

* * * * *